United States Patent
Forster

(10) Patent No.: US 10,565,411 B2
(45) Date of Patent: Feb. 18, 2020

(54) DETECTION OF SEAL INTEGRITY ON PRODUCTS USING RFID

(71) Applicant: Avery Dennison Retail Information Services, LLC, Mentor, OH (US)

(72) Inventor: Ian J. Forster, Chelmsford (GB)

(73) Assignee: AVERY DENNISON RETAIL INFORMATION SERVICES LLC, Mentor, OH (US)

( * ) Notice: Subject to any disclaimer, the term of this patent is extended or adjusted under 35 U.S.C. 154(b) by 0 days.

(21) Appl. No.: 16/225,787

(22) Filed: Dec. 19, 2018

(65) Prior Publication Data
US 2019/0205581 A1 Jul. 4, 2019

Related U.S. Application Data

(60) Provisional application No. 62/611,654, filed on Dec. 29, 2017.

(51) Int. Cl.
*G08B 13/14* (2006.01)
*G06K 7/10* (2006.01)
*G06K 19/07* (2006.01)
*G06K 19/077* (2006.01)

(52) U.S. Cl.
CPC ..... *G06K 7/10386* (2013.01); *G06K 7/10405* (2013.01); *G06K 19/0723* (2013.01); *G06K 19/07758* (2013.01)

(58) Field of Classification Search
CPC .......... G06K 7/10386; G06K 7/10405; G06K 19/0723; G06K 19/07758
See application file for complete search history.

(56) References Cited

U.S. PATENT DOCUMENTS 4,714,167 A * 12/1987 Sandhaus .......... B65D 41/0421
215/270
4,722,451 A 2/1988 Conrad
(Continued)

FOREIGN PATENT DOCUMENTS

DE 10335976 2/2005
EP 2619106 8/2013
(Continued)

OTHER PUBLICATIONS

International Search Report and Written Opinion of ISA/EPO dated Mar. 29, 2019 prepared for PCT/US2018/066471.

*Primary Examiner* — Munear T Akki
(74) *Attorney, Agent, or Firm* — Avery Dennison Retail Information Services LLC

(57) ABSTRACT

A system and method for determining and communicating the status of a sealable container. The system comprises a seal status detection component that is positioned adjacent to or on a lid comprising a deflectable component. The lid engages the sealable container to form a seal. The seal status detection component moves between a first state of operation where there is a gap between the seal status detection component and the deflectable component of the lid, and a second state of operation where the seal status detection component is adjacent to or in contact with the deflectable component of the lid. The seal status detection component has a first frequency response to interrogation by a reader when the seal is intact, and a second frequency response when the seal is broken.

11 Claims, 4 Drawing Sheets

(56) References Cited

U.S. PATENT DOCUMENTS

| | | | | |
|---|---|---|---|---|
| 4,759,457 | A * | 7/1988 | Nakayama | B65D 50/06 215/228 |
| 4,877,143 | A * | 10/1989 | Travisano | B65D 55/066 215/230 |
| 5,197,618 | A * | 3/1993 | Goth | B65D 51/20 206/484.2 |
| 5,240,131 | A * | 8/1993 | Keller | B65D 79/005 215/230 |
| 5,289,929 | A * | 3/1994 | Heilman | B65D 55/026 116/279 |
| 5,566,846 | A * | 10/1996 | James | B65D 55/026 116/212 |
| 5,707,823 | A * | 1/1998 | Carr | C12M 23/08 215/270 |
| 6,164,470 | A * | 12/2000 | Chino | B65D 51/20 215/232 |
| 2006/0214789 | A1 * | 9/2006 | Posamentier | G06K 19/0716 340/545.6 |
| 2007/0013521 | A1 * | 1/2007 | Lindsay | G06K 19/0716 340/572.1 |
| 2007/0296599 | A1 | 12/2007 | Wang et al. | |
| 2010/0117797 | A1 * | 5/2010 | Bauchot | B65D 55/028 340/10.1 |
| 2012/0211386 | A1 | 8/2012 | Haimi | |

FOREIGN PATENT DOCUMENTS

| | | |
|---|---|---|
| EP | 3240200 | 4/2016 |
| WO | 2006016184 | 12/2005 |

\* cited by examiner

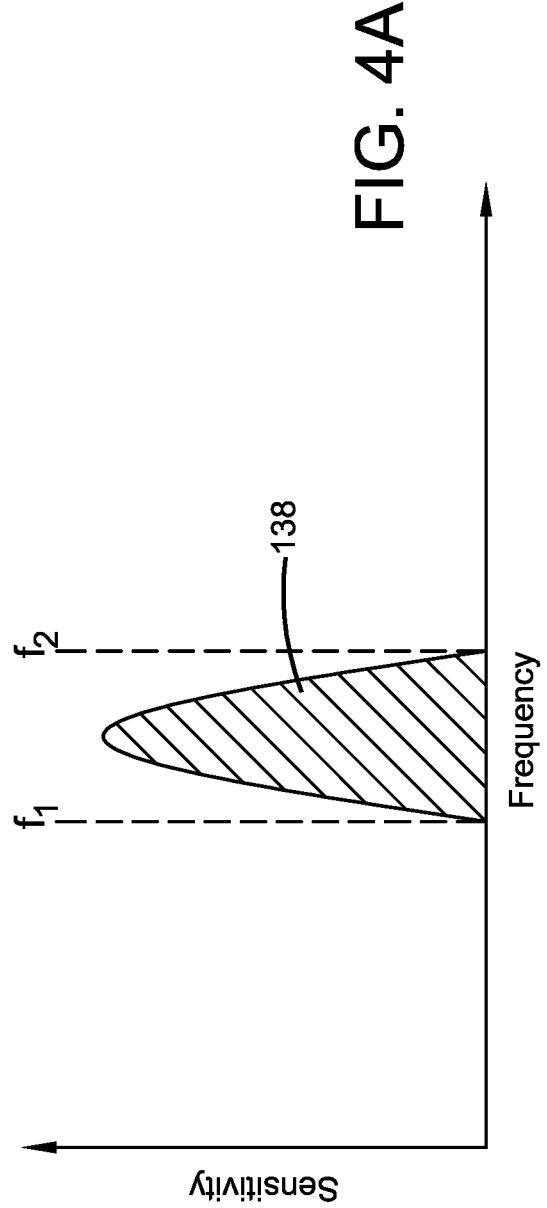
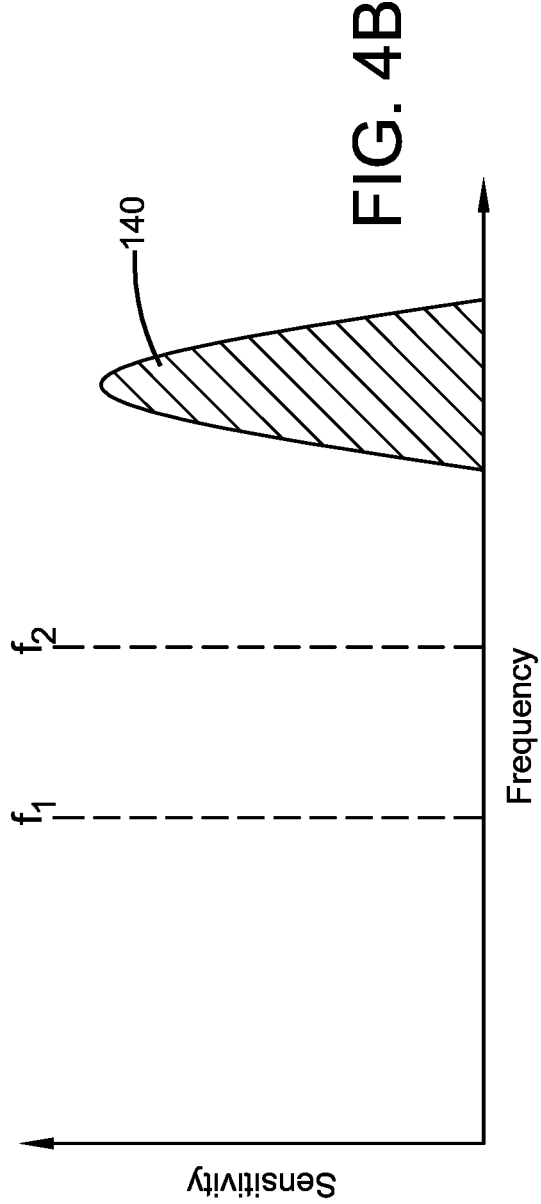

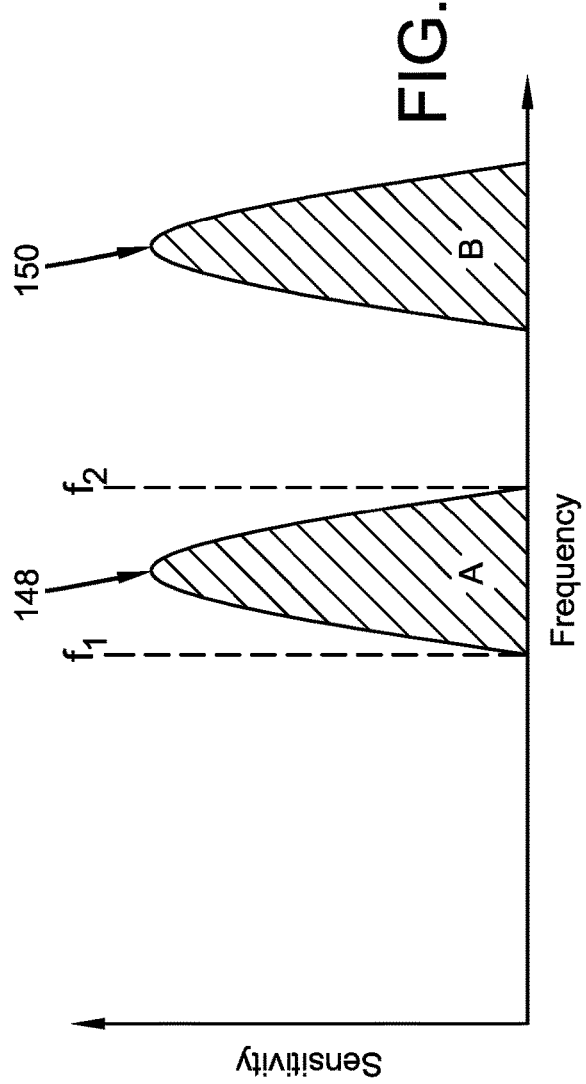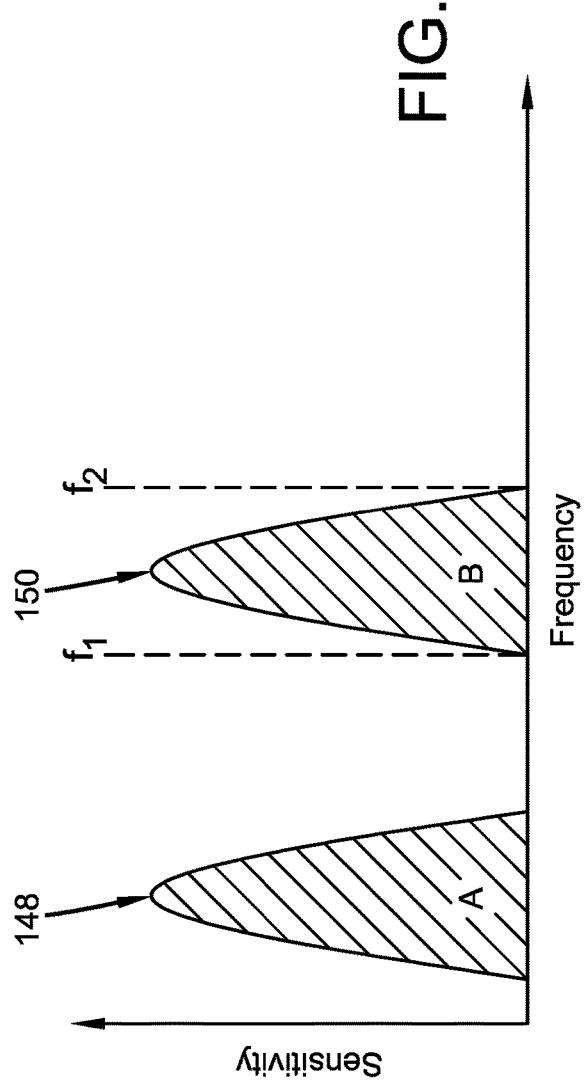

DETECTION OF SEAL INTEGRITY ON PRODUCTS USING RFID

CROSS-REFERENCE TO RELATED APPLICATION(S)

The present application claims priority to and the benefit of U.S. provisional patent application No. 62/611,654 filed Dec. 29, 2017, which is incorporated by reference herein in its entirety.

BACKGROUND

The present invention relates generally to systems and methods of determining the status of a container seal. Specifically, the system interfaces a seal status detecting device, such as a radio-frequency identification ("RFID") tag, with a sealable container. The present subject matter is especially suited for use in determining if a seal on a container is broken where there is no visible indication of the break. Accordingly, the present specification makes specific reference thereto. However, it must be appreciated that aspects of the present inventive subject matter are also equally amenable to other like applications.

RFID (Radio Frequency Identification) uses magnetic, electric or electromagnetic fields transmitted by a reader system to stimulate a responsive device (known as an RFID "tag" or transponder) to identify itself and, in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency interrogation signal received from a reader, also referred to as an interrogator. In the case of passive RFID tags, the energy of the interrogation signal also provides the necessary energy to operate the RFID tag.

There are many applications where a sealed container or environment is desirable. Many products, such as baby food, medications, cosmetics, and the like, require or benefit from protection from air, moisture and other contaminants and/or tampering when stored before use. If not properly stored in a vacuum or low pressure environment, these products can spoil or become unsafe or otherwise unusable. These types of products are often stored in containers where it is not easy or even impossible to visualize whether or not the container seal is intact. It also can be advantageous to be able to remotely determine whether or not a container seal has been broken or remains intact.

It is also extremely important for both an end user or customer and a seller or manufacturer to have some assurance that the contents of the container are in the appropriate condition. It is also desirable to have containers that have automatic identification technology for inventory control, content identification, and any other logistical information. RFID is one type of automatic identification technology. The RFID may be used to track containers, provide information about the contents, such as a product name and expiration date, and other unique product data.

Some sealable containers use a "pop-up" style cap or lid that deflects inwardly when the internal pressure within the sealed container is relatively low in comparison to the external environment. When the seal is broken on such containers, the lid pops up indicating that the container has been opened and/or that outside air has entered. This type of container is commonly used for products like baby food. However, if the lid is not readily visible, such as if it is covered with a label or stored in an enclosed carton, there is no way for a user to know the status of the container seal.

Consequently, it would be advantageous to not only remotely determine information about contents sealed in a container, but also to be able to determine whether the contents are still properly protected by the container seal. The present invention discloses a system and method for detecting the status of a sealed container and communicating that status to a user using RFID.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a system for detecting a change in the status of a container seal. The system comprises a container, a lid configured to engage the container thereby forming a seal between the lid and the container, and a seal status detection component attachable to the lid for indicating and communicating the status of the seal. The seal status detection component may comprise a RFID tag that is positioned over the lid. The RFID tag is operational when the lid is inwardly deflected, as when an interior of the container is in a vacuum state. When the seal of the container is broken and the interior of the container is no longer in a vacuum state, the lid will un-deflect, or pop up, and come into proximity or contact with the RFID tag, thereby disabling the RFID tag. The change in operability of the RFID tag can be read with a RFID reader.

In another embodiment, a system for detecting the status of a seal of a container comprises a seal status detection component that may be placed adjacent to a deflectable lid of the container. The seal status detection component electrically communicates the status of the seal as the seal status detection component moves between a first state of operation and a second state of operation indicating a change in status of the seal.

In yet another embodiment of the present invention, the subject matter discloses a method of determining the status of a sealed container. A sealed container with an internal pressure lower that a pressure of an outside environment is provided. A seal status detection component is attached to the sealed container. The seal status detection component is configured to detect a change in the status of the sealed container and communicate the change in status when interrogated by an RFID device.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 4A illustrates a graphical view of a first state of operation of a seal detection component of the system in accordance with the disclosed architecture.

FIG. 4B illustrates a graphical view of a second state of operation of the seal detection component of the system in accordance with the disclosed architecture.

FIG. 5A illustrates a graphical view of a first identity of a seal detection component in accordance with the disclosed architecture.

FIG. 5B illustrates a graphical view of a second identity of the seal detection component in accordance with the disclosed architecture.

DETAILED DESCRIPTION

Figure 1:
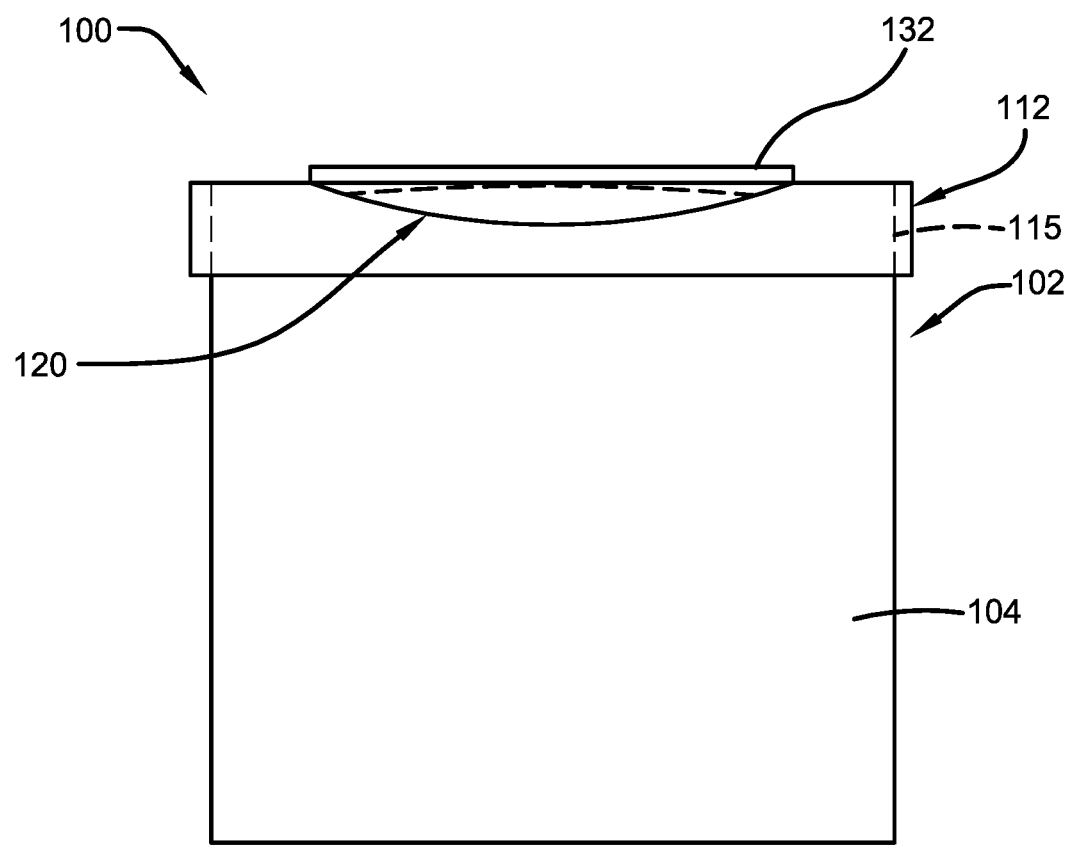
FIG. 1 illustrates a perspective view of a system for determining the status of a container seal in accordance with the disclosed architecture.
Figure 1:
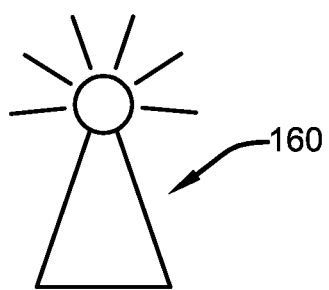

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a system and method for determining and communicating the condition of a seal on a container. Food based products, pharmaceuticals, cosmetics, and other products are often stored in sealed containers under a vacuum to preserve the original or optimal condition of the product for as long as possible. Many of these containers employ a 'pop-up' style metal lid or cap having a button area that is held down when the pressure inside the container is low relative to the pressure of the outside environment, but that pops back up or otherwise undistorts when the container seal is broken and air gets in to the container. The present invention relates to a change in frequency in a RFID label or tag placed adjacent to or across the "pop-up" button area of the container lid. When the button area is held down or inwardly deflected, the RFID tag is operational. However, when the container seal is disturbed, the button area pops back up or un-deflects due to the change in internal pressure in the container and makes contact with the RFID tag thereby rendering it inoperable or otherwise changing its state of operation. Further, the state of the RFID tag is detectable via interrogation by an RFID reader. The tag may be positional inside of the container or externally. Anyone with a reader, including customers, may readily scan the tag to determine whether or not the container seal is intact at any time, which is useful for determining whether the container has been tampered with.

Referring initially to the drawings, FIG. 1 illustrates a system 100 for determining the status of a seal. The system 100 comprises a container seal status detection component 132 capable of electrically communicating the status of the seal. The system 100 may further comprise a container 102 having an internal volume 104 and an opening (not shown), and a lid 112 configured to engage the container 102 to form a seal 115. The seal status detection component 132 may be positioned adjacent to or on top of lid 112. The lid 112 comprises a sealing portion around a periphery of the lid 112 configured to engage the opening in the container 102 to form seal 115. The lid 112 further comprises a deflectable component 120 within the lid 112. The lid 112 is typically manufactured from metal or a dielectric material, but other common materials may also be used.

Figure 2:
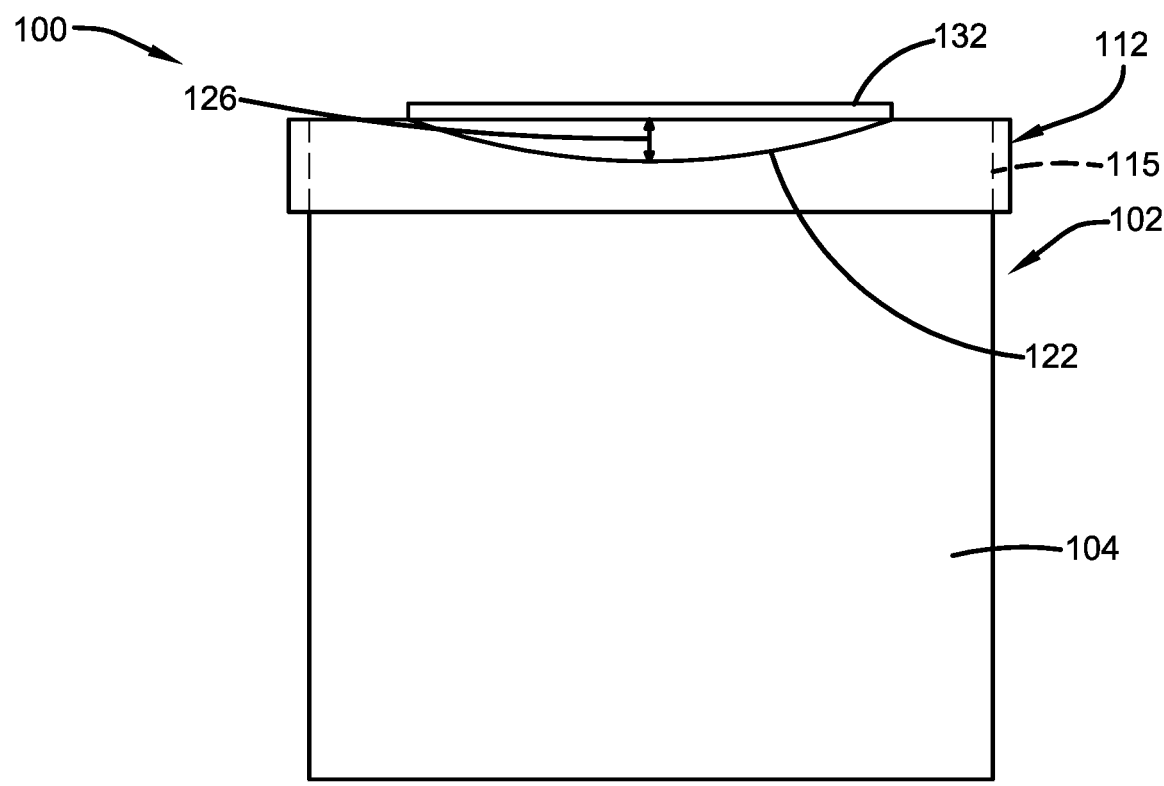
FIG. 2 illustrates a perspective view of the system where the seal is intact in accordance with the disclosed architecture.
Figure 3:
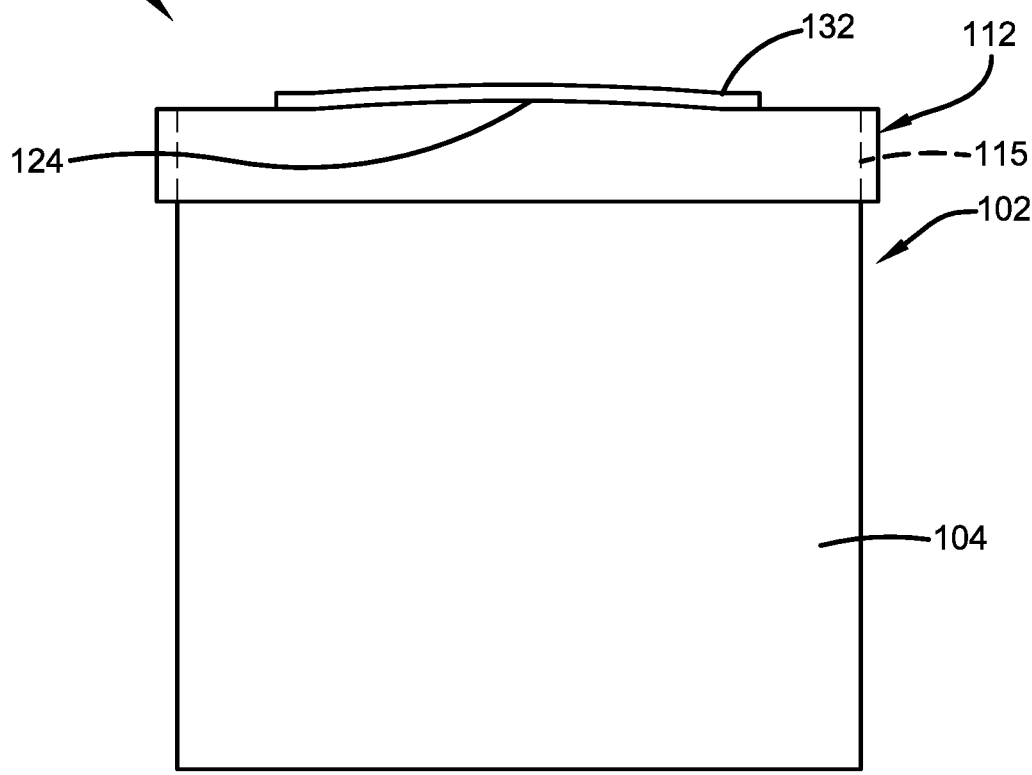
FIG. 3 illustrates an embodiment of perspective view of the system where the seal is not intact in accordance with the disclosed architecture.

The deflectable component 120 may be a pop-up type button or any other similar type of distortable configuration. As best shown in FIGS. 2 and 3, deflectable component 120 is movable between a first orientation 122 (illustrated in FIG. 2), and a second orientation 124 (illustrated in FIG. 3). More specifically, the first orientation 122 is an inward deflection of the deflectable component 120 that is present when the container 102 is sealed and the interior 104 of the container 102 is in a vacuum state, defined as when the pressure of interior 104 is less than the external environment outside of container 102. The external air pressure pushes the deflectable component 120 inward.

When the seal 115 of container 102 is broken or breached, because the container has been opened or otherwise tampered with, the deflectable component 120 returns to the second orientation 124. More specifically, and as best shown in FIG. 3, in the second orientation 124 the deflectable component 120 returns to a flat or domed state as the internal pressure of container 102 normalizes. Additionally, microbial activity in a product in the container 102 may also alter the internal pressure to reduce or eliminate the vacuum seal, thereby indicating that the product is no longer safe to use or consume. The change in pressure will cause the deflectable component 120 to return to its natural state in the second orientation 124.

The seal status detection component 132 is typically placed, positioned, attached, or otherwise disposed on top of the lid 112 directly over the deflectable component 120. However, the seal status detection component 132 may be placed anywhere it would function to detect a change in the status of seal 115 including, without limitation, inside the lid 112 or the container 102. When the deflectable component 120 is in the first orientation 122 inwardly deflected, a gap 126 is generated between the deflectable component 120 and the seal status detection component 132. This gap 126, or distance, between the lid 112 and the seal status detection component 132 affects the performance of the seal status detection component 132.

The seal status detection component 132 is typically a RFID tag or label and may use near field communication (NFC) to communicate the status of seal 115. This is advantageous as a NFC label is attachable to existing containers, and does not require the product or the container to be altered during manufacturing. Additionally, a customer or user (not shown) can interrogate the seal status detection component 132 with a personal electronic device, such as a mobile phone, a tablet computer, or the like.

The seal status detection component 132 is also usable to store information related to the product contained in container 102 such as, but not limited to, product information, product identity, dosage, web address, product use, before or best use dates, logistical information, tracking information, and/or the like. The RFID tag 132 may be read or interrogated by a reader 160, as best illustrated in FIG. 1, incorporated into a structure in a retail environment such as a shelf, a point of sale (POS) system, an exit gate, a wide area reader system, or a reader incorporated into a hand held device like a cell phone, a tablet, or the like. When RFID tag 115 is scanned after the seal 115 is no longer intact, the product identity, date or time opened, and the duration after opening may be determined and recorded by the reader 160 and conveyed to a user. More specifically, the reader 160 and suitable accompanying software and user interfaces may be used to alert a customer when seal 115 has been tampered with and/or other useful product information relative to container 102.

The seal status detection component 132 changes its state of operation when the metal surface of the deflectable component 120 moves relative to the RFID tag. The distance 126 between the metal of the deflectable component 120 and the seal status detection component 132 may either enhance or allow operation of the RFID tag, or reduce or inhibit operation of the RFID tag. The state of the metal surface may also trigger a digital indicator or other notification in the RFID tag when the metal surface moves relative to the RFID tag as well. Similarly, the RFID tag may comprise two devices or identities that swap when the metal surface moves relative to the RFID tag.

Typically, the seal status detection component 132 is operable when the deflectable component 120 is in the first orientation 122, and is inhibited when in the second orientation 124. The contact or proximity or the deflectable component 120 to the seal status detection component 132 is what causes the change in seal status detection component 132. However, the system may also be reversible so that the seal status detection component 132 is inhibited when the deflectable component 120 is in the first orientation 122, and is operable when in the second orientation 124. In any event, the distance 126 between the lid 112, specifically the deflectable component 120, and the seal status detection component 132 is what determines a frequency response of the seal status detection component 132 when the metal of the lid 112 interacts with the RFID tag.

The seal status detection component 132 moves between a first state of operation 138, as illustrated in FIG. 4A when seal 115 is intact, and a second state of operation 140, as illustrated in FIG. 4B, when seal 115 is not intact. The frequency response of the RFID tag changes as the seal status detection component 132 moves between the first and second states of operation. The sensitivity of the RFID is the level of RF power required to make the seal status detection component 132 communicate with the reader 160 at a specific range, illustrated as f1-f2. For example, the f1-f2 range may be 13.2 MHz to 14 MHz, or 860 MHz to 870 MHz. If the tag frequency response is not matched to the read frequency range, the effective sensitivity is very low, and the RFID tag can only be read or interrogated at a relatively short range or distance, if at all. As such, the performance of the seal status detection component 132 is changed between the first state of operation 138 and the second state of operation 140. It will be appreciated that the RFID tag may be designed so that it coincides with the read frequency in either the first 138 or the second 140 operational states, so that the performance of the RFID tag is either suppressed or enhanced by being in a particular state.

As illustrated in FIGS. 5A and 5B, the seal status detection component 132 may move between a first identity 148 having a first frequency response when seal 115 is intact, and a second identity 150 having a second frequency response when seal 115 is not intact. However, the reverse is also possible where the seal status detection component 132 may move between the first identity 148 having the first frequency response when seal 115 is not intact, and the second identity 150 having the second frequency response when seal 115 is intact. The RFID tag therefore has two frequency responses associated with two different identities. The first identity 148 and the second identity 150 shift frequency together in the first operational state and the second operational state. In the first operational state, the first identity 148 is tuned or active, so that the strongest or only response to the reader 160 is when the seal status detection component 132 is at the first identity 148. In the second operational state, the second identity 150 is tuned or active, so that the strongest or only response to the reader 160 is when the seal status detection component 132 is at the second identity 150. Using this method, both the first operational state and the second operational state can respond to the reader 160. Therefore, the system 100 is able to discriminate between a RFID tag failure, providing no response as in FIGS. 2A and 2B, and a change in state.

A method of detecting the status of a sealed container is also disclosed. The method comprises the steps of: (i) providing a sealed container 102 with an initial internal pressure that is lower than an outside or external environment; (ii) attaching a seal status detection component 132 to the sealed container 102; and (iii) interrogating the seal status detection component 132 to determine a change in the status of sealed container 102. More specifically, the container 102 comprises a lid 112 having a deflectable component 120, wherein the container 102 and the lid 112 form a seal 115 that helps maintain the internal pressure of the container 102 when said seal 115 is intact. A seal status detection component 132 is attached or positioned on the lid 112 over or atop the deflectable component 120. A change in status of the container 102 occurs when seal 115 is broken or otherwise disturbed and there is a change in the internal pressure of container 102. The seal status detection component 132 is altered when seal 115 is broken moving from a first state of operation 138 to a second state of operation 140. The change in state is detectable by a reader 160, such as an RFID reader.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for detecting a status of a seal comprising:
    a container;
    a lid configured to engage the container to form the seal between the lid and the container;
    a seal status detection component positioned adjacent to the lid for indicating and communicating the status of the seal;
    the seal status detection component comprise a RFID tag that is positioned over the lid;
    enabling an operation of the RFID tag when the lid is inwardly deflected, as when an interior of the container is in a vacuum state;
    when the seal of the container is broken and the interior of the container is no longer in the vacuum state, the lid will un-deflect, or pop up, and come into proximity or contact with the RFID tag, thereby disabling the operation of the RFID tag;
    the enabling and disabling operation of the RFID tag read by a RFID reader.

2. The system of claim 1, wherein the lid comprises a deflectable component movable between a first orientation and a second orientation.

3. The system of claim 2, wherein the first orientation is an inward deflection created when the container is sealed and an interior of the container is in a vacuum state.

4. The system of claim 2, wherein the second orientation is an outward deflection created when the seal is not intact.

5. The system of claim 2, wherein the seal status detection component is disposed over the deflectable component.

6. The system of claim 2, wherein the seal status detection component is operable when the deflectable component is in the first orientation.

7. The system of claim 2, wherein the seal status detection component is inhibited when the deflectable component is in the second orientation.

8. The system of claim 1, wherein the seal status detection component moves between a first state of operation when the seal is intact and a second state of operation when the seal is not intact.

9. The system of claim 1, wherein the seal status detection component moves between a first identity having a first frequency response when the seal is intact and a second identity having a second frequency response when the seal is not intact.

10. The system of claim 1, wherein the lid is comprised of a conductive metal or a dielectric material.

11. The system of claim 1, wherein the seal detection status component uses near field communication to communicate the status of the seal.

* * * * *